United States Patent [19]

Kawaguchi et al.

[11] 4,291,600
[45] Sep. 29, 1981

[54] PROCESS AND APPARATUS FOR CUTTING CIRCUMFERENTIAL SURFACE TO REMOVE ROD SURFACE FLAWS

[75] Inventors: Yosiyuki Kawaguchi, Ashiya; Takashi Nishida, Nishinomiya; Nobuaki Marukawa, Toyonaka; Tadakazu Tanaka, Kobe; Yoshinari Kontani, Shinminato, all of Japan

[73] Assignees: Kobe Steel, Limited, Kobe; Nippon Koshuha Steel Co., Ltd., Tokyo, both of Japan

[21] Appl. No.: 9,914

[22] Filed: Feb. 6, 1979

[51] Int. Cl.³ .......................... B23B 1/00; B23B 5/12
[52] U.S. Cl. ........................................ 82/1 C; 82/20
[58] Field of Search .................................. 82/20, 1 C

[56] References Cited

U.S. PATENT DOCUMENTS

| | | | |
|---|---|---|---|
| 2,655,066 | 10/1953 | Siegerist | 82/20 |
| 3,128,658 | 4/1964 | Mitchell et al. | 82/20 |
| 3,381,558 | 5/1968 | Eisenhardt | 82/20 |
| 3,513,731 | 5/1970 | Michelson | 82/20 |

Primary Examiner—Leonidas Vlachos
Attorney, Agent, or Firm—Oblon, Fisher, Spivak, McClelland & Maier

[57] ABSTRACT

Process and apparatus for cutting surface flaws of a material to be machined, including detecting the travelling speed and position of a wire material or a rod-like material in order to set a cut-in quantity to be applied to a cutting tool on the basis of a flaw-depth signal of the signals so detected, operating the advancing and retreating timings of the cutting tool on the basis of the travelling speed signal, the flaw the surface flaw position signal and a tool cut-in angle set value signal that is set in advance, operating simultaneously the advancing and retreating speeds of the cutting tool on the basis of the travelling speed signal and the cut-in angle set value signal and actuating and controlling a tool driving device in accordance with the results of these operations.

5 Claims, 14 Drawing Figures

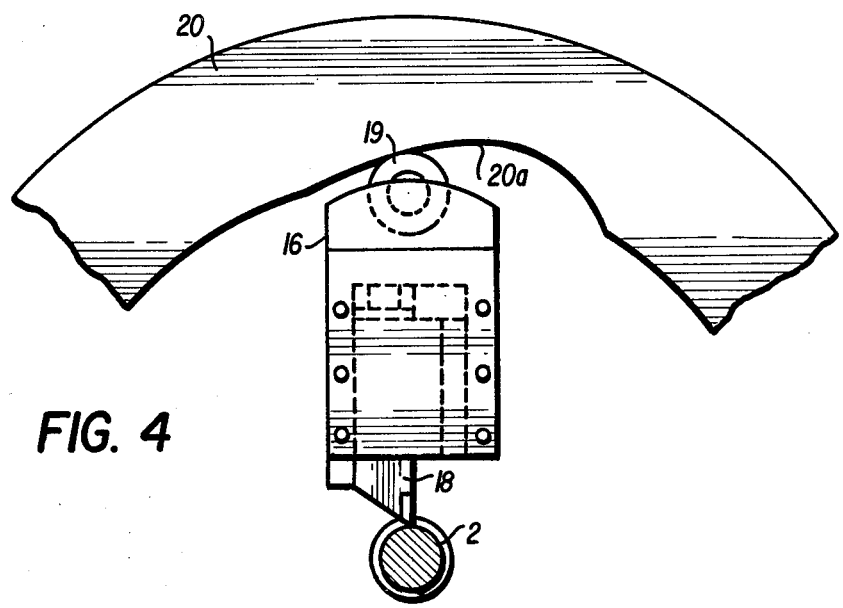
FIG. 4
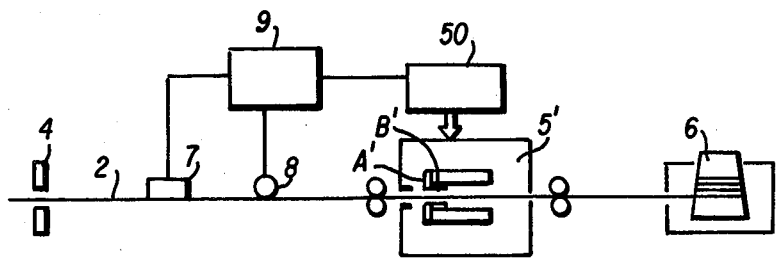
FIG. 6
FIG. 8
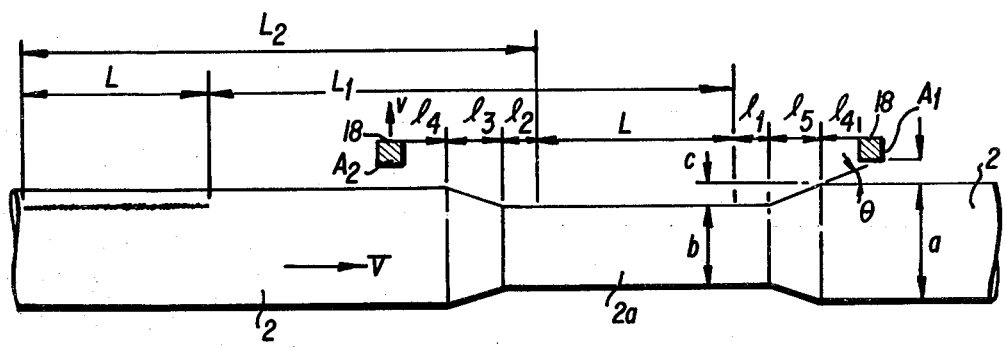

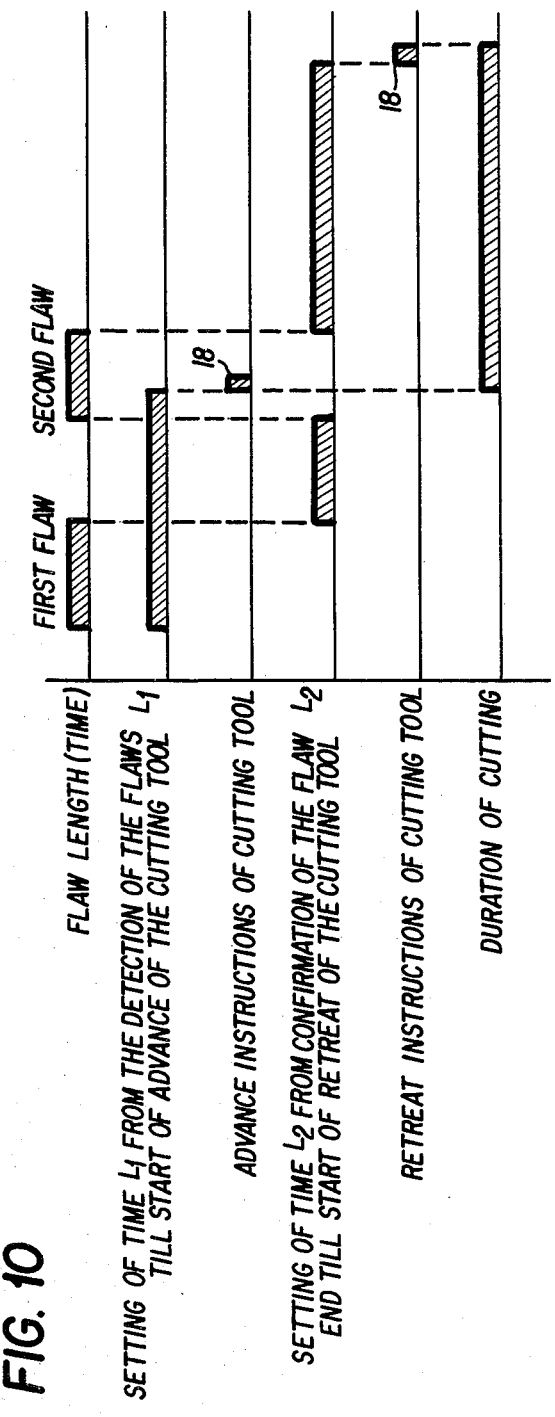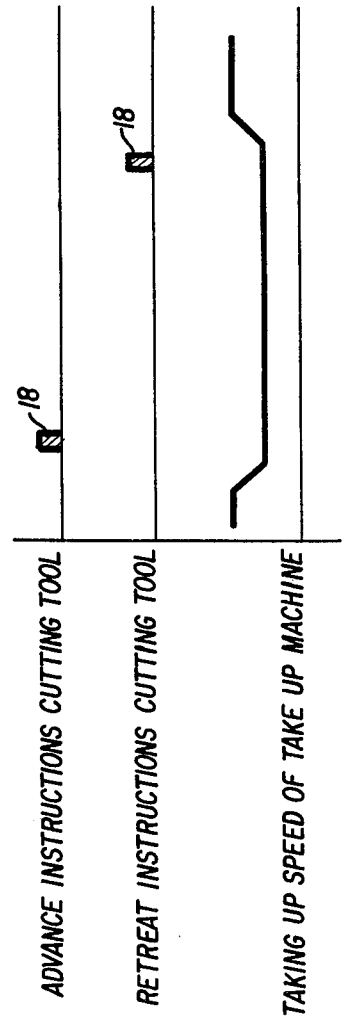

PROCESS AND APPARATUS FOR CUTTING CIRCUMFERENTIAL SURFACE TO REMOVE ROD SURFACE FLAWS

BACKGROUND OF THE INVENTION

(1) Field of the Invention

This invention relates to a process and an apparatus for cutting and removing automatically only the flaw portion of a wire material and a rod-like material by use of a centerless peeling machine for the automatic cutting and removal of the surface flaws of these materials having the construction wherein the cutting tool is allowed to advance and retreat freely.

(2) Description of the Prior Art

In producing specific bar steel and a stainless steel, or a wire product, a blank material is subjected to the hot rolling treatment and then converted into a coil after its surface flaws are sufficiently removed, as is well known in the art. However, flaws having a maximum depth of about 0.3 mm are partially scattered on the surface of the coil, and the following steps have been employed conventionally in order to remove these flaws to feed the material to the subsequent machining stage;

(1) The blank material is stripped off over its entire length and thus peeled by use of a tipper die;

(2) The blank material is cut and peeled by a centerless peeling machine; and (3) Flaws are detected by visual observation and only the flaw portions are ground and peeled by a hand grinder, etc.

In the methods (1) and (2), however, the blank material is frequently peeled even into the flawless portion so that lowering of the yield of product, quick consumption of peeling tools and increase in the cost are remarkable, while in the method (3), peeling is effected only to the necessary portion so that the yield of product can be improved to a marked extent. However, this method is not free from the problem of extremely poor working property because a cold coil is first released and flaws on the outer circumference of a wire or rod material are then detected by the visual check to require grinding each time flaws are found. Hence, this method is not satisfactorily efficient and results in the disadvantage of a drastic increase in the labor cost.

The present invention solves these problems of the conventional surface flaw removal and enables one to restrict the increase in the labor cost, to improve the yield of product, to materialize high efficiency due to shortening of cutting time and thus to ensure reduction of the overall cost by cutting automatically on the flaw portion(s) of the blank material. By the use of a centerless peeling machine which is capable of advancing and retreating to and from the material to be machined, the present invention enables one control automatically a sequence of cutting works including the detection of flaws, advancing and retreating actions of the cutting tool most suitable for the conditions of the flaws so detected and the suitable travelling speed of the material to be machined.

SUMMARY OF THE INVENTION

Accordingly, the first object of the present invention is to provide a process and an apparatus for cutting the surface flaws of a wire material or a rod-like material which is highly efficient and improves the yield of the material to a marked extent.

The second object of the present invention is to provide a process and an apparatus for cutting the surface flaws of a wire material or a rod-like material which prevents rapid consumption of a cutting tool because cutting is made only to the flaw portions, and remarkably reduces the overall cost of the cutting work by shortening the necessary work time.

The first embodiment of the present invention to accomplish these and other objects thereof provides a process for cutting the surface flaws of a material to be machined including the steps of detecting the travelling speed and the surface flaw position of a wire material or a rod-like material, setting a cut-in quantity to be applied to a cutting tool on the basis of a flaw-depth signal of the signals so detected, operating advancing and retreating timings of the cutting tool on the basis of the travelling speed signal, the flaw position signal and a tool cut-in angle set value signal that is set in advance, operating simultaneously advancing and retreating speeds of the cutting tool on the basis of the travelling speed signal and the cut-in angle set value signal, and actuating and controlling a tool driving device in accordance with the results of these operations.

In the abovementioned first embodiment, the second embodiment of the present invention relates to a process for cutting surface flaws characterized in that the travelling speed of the material to be machined is controlled to a speed suitable for the cutting work during cutting and to a speed higher than the speed at the time of cutting when cutting is not effected.

The third embodiment of the present invention provides an apparatus for cutting the surface flaws of a wire material or a rod-like material which includes a mechanism for detecting the position and depth of the flaw and generating detection signals; a mechanism for detecting the travelling speed of the wire material or the rod-like material; a cutting member for advancing and retreating only the outer circumference of the surface flaw portion of the material to be machined in the radial direction; a mechanism for setting the cut-in quantity to be applied to the cutting member in accordance with the flaw depth signal of the detection signals; a mechanism for operating the advancing and retreating timings of the cutting member on the basis of the travelling speed of the material to be machined, the flaw position signal and a cut-in angle set value signal for the cutting member that is set in advance; means for operating the advancing and retreating speeds of the cutting member on the basis of the travelling speed signal and the cut-in angle set value signal of the cutting member; and mechanism for driving the cutting member on the basis of the results of these operations.

With regard to the apparatus as described in the third embodiment of the present invention, the fourth embodiment of the present invention provides an apparatus for cutting the surface flaw of a wire material or a rod-like material which further includes a hollow shaft defining therein a travelling passage of the material to be machined; a retractile tool holder capable of advancing and retreating in the radial direction of the material to be machined; a rotary outer cylinder having the retractile tool holder fitted onto the front end surface thereof via a holder fitting member, fitted turnably onto said hollow shaft from the outside and mounted turnably onto a frame; a cam follower fitted to the rear end of said tool holder; a cam member having a cam surface defined on the inner circumference thereof in sliding contact with the cam follower and fitted turnably onto the holder fitting member from the outside; a gear fitted turnably to the front end portion of said rotary outer cylinder and combined integrally with the cam member; a gear train; and an over-drive device transmitting revolution of the rotary outer cylinder to the gear.

The fifth embodiment of the present invention provides an apparatus for cutting the surface flaw o a wire material or a rod-like material as described in the third embodiment of the type wherein flaws present in the surface of the wire material or the rod-like material having a circular section are detected by an eddy current flaw detector and the travelling speed of the material to be machined is detected by a pair measuring rolls or an optical detecting mechanism so that only the outer circumference of the flaw portions of the material to be machined is cut and removed by a rotary cutting tool capable of advancing and retreating in the radial direction on the basis of the information regarding the position of flaws in the longitudinal direction from the flaw detector and the information regarding the travelling speed by the measuring rolls, or an optical detecting means, such apparatus including; a hollow shaft defining therein the travelling passage of the material to be machined; a connection tube fitted from the outside onto the outer circumference of the hollow shaft both turnably and movably in the longitudinal direction; a rotary outer cylinder fitted turnably onto the outer circumference of the connection tube; a driving pulley fitted to the outer circumference of the rotary outer cylinder and transmitting a driving force to each rotary member; a chuck main body fitted to the front end portion of the rotary outer cylinder; slit sections defined in the radial direction equidistantly around the circumference of the chuck main body; a cam lever pin fitted into each of the slit sections in the direction parallel to the tangential line of the rotary members such as the rotary outer cylinder; a cam lever having one end pivoted to each of the cam lever pins, a cam surface defined at the pivoted portion on the outer circumference thereof and the other end locked at the front portion of the connection tube; a holder support member disposed inside each of the slit sections of the chuck main body, engaging with the cam surface of the cam lever and capable of advancing and retreating in the radial direction; a cutting tool fitted to each of the holder support members via a holder; a piston section of a large diameter formed at the rear portion of the connection tube; and a rotary cylinder fitted to the rear end portion of the rotary outer cylinder allowing the piston section to engage therewith and to slide back and forth.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 3 and 4 are longitudinally sectional side views showing, respectively, the principal portions of the cutting tool and its advancing mechanism in accordance with the present invention;

FIG. 6 is a schematic view showing the arrangement of the principal constituent members of the cutting tool-advancing system centerless peeling machine in accordance with the present invention;

FIG. 8 is a schematic view showing the cutting condition in accordance with the process of the present invention;

FIGS. 9 and 10 are time charts each showing the relationship between flaws and the cutting tool;

FIG. 11 is a diagram showing the relationship between the cutting tool and the travelling speed of the wire material;

DETAILED DESCRIPTION OF THE PREFERRED EMBODIMENTS

Figure 1:
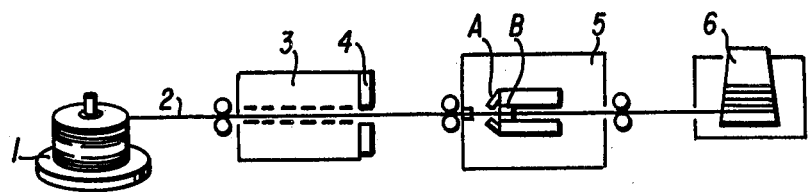
FIG. 1 is a schematic view showing a cutting line by the conventional centerless peeling machine.

The present invention wil now be explained in greater detail by referring to embodiments thereof shown in the accompanying drawings in which FIG. 1 shows an example of the flaw cutting line for a wire or rod material by a conventional centerless peeling machine. As shown in this drawing the blank wire material 2 mounted in the coil form onto a supply stand 1 is first led into a wire-straigtener 3 where it is corrected into the straight wire, then led into a cutting machine 4 where its bent portions are cut off, and finally led into a centerless peeling machine where it is cut in a pre-set quantity (maximum flaw depth=approx. 0.3 mm) over its entire length with the same cutting depth by means of a rotary tool A incorporated in the peeling machine. In order to prevent oscillation of the blank wire 2 during its cutting, a collet B is also incorporated in the peeling machine 5 and after cutting, grips and holds its diameter in a reliable manner.

The blank wire 2 cut in this manner is then taken up and wound by a winding machine 6, and the feeding speed of the blank wire 2 is restricted by the winding speed of the winding machine 6. In the prior art apparatus of this kind, however, the portions free from flaws are cut off in the same way as those having flaws, as mentioned in the foregoing paragraph. Unlike the centerless peeling machine 5 of this type, the present invention presents considerable improvements to the centerless peeling machine wherein its cutting tool A is freely retractile by a driving means so that it is able to detect the surface flaws and to cut and remove only the flaw portions. At the same time, the present invention controls automatically this centerless peeling machine in accordance with the controlling method which is also the subject matter of the present invention.

FIGS. 2 through 5 show an example of this centerless peeling machine 5', of which details will be set forth hereinbelow, and FIG. 6 shows an embodiment of the controlling method of the present invention. Namely, in order to detect the surface flaws on the blank wire 2, a flaw detector 7 such as a known rotary probe type eddy current flaw detector is interposed between the cutting machine 4 and the centerless peeling machine 5' shown in FIGS. 2 through 6 together with a measuring roller 8 and the controlling device 9 in accordance with the present invention whereby the controlling device 9 is communicated with a hydraulic device 50 for actuating the cutting tool A' and the collet B' of the peeling machine 5'. Prior to the explanation about the content of controlling by this controlling device 9, explanation is first given regarding the construction of the retractile type centerless peeling machine 5', which is suitably controlled by the present invention, with reference to FIGS. 2 through 6.

Figure 2:
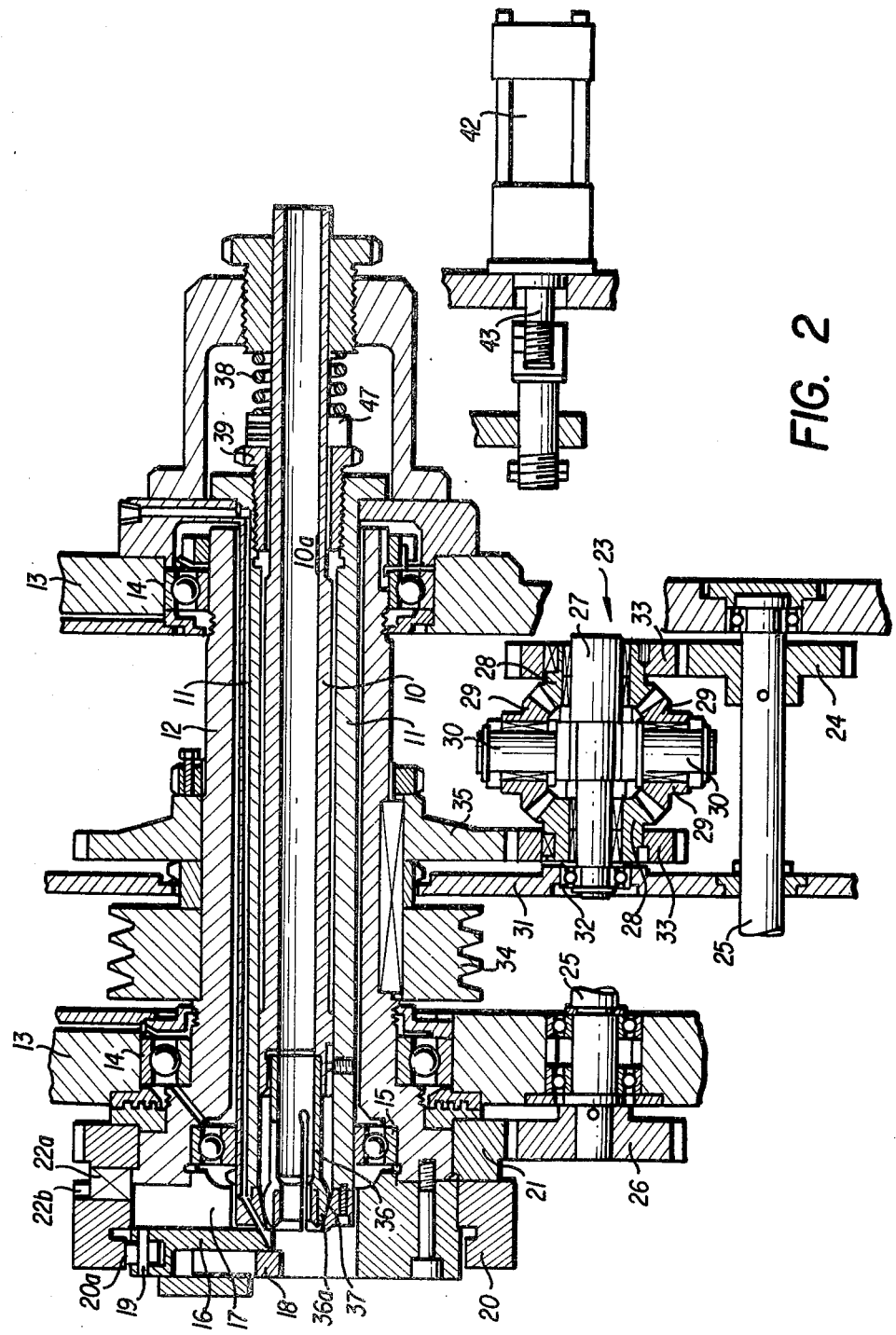
FIG. 2 is a longitudinally sectional front view showing the principal portion of an example of the centerless peeling machine of the cutting tool-advancing system used for the practice of the process of the present invention.

FIG. 2 is a longitudinally sectional front view showing the principal portion of the abovementioned centerless peeling machine. First, the travelling passage 10a of the blank wire 2 as the material to be cut which is shown in FIG. 1 is defined in a hollow collet shaft 10 using its hollow cylinder. The hollow collet shaft 10 is inserted into a hollow shaft 11 both retractilly and coaxially, and the this hollow shaft 11 is in turn fitted coaxially and turnably into a rotary outer cylinder 12, which is turnably mounted onto frames 13, 13 via respective bearings 14, 14. A tool holder 16, which is retractible in the direction of radius of the blank wire 2, is adapted, via a holder fitting member 1, to the end surface at the front end of the outer cylinder 12 at such a position where it is located above the front end portion of the hollow shaft 11 via a separate bearing 15. A cutting tool 18 is held inside the tool holder 16 and a cam follower 19 is disposed at the rear end of the holder 16 in the radial direction. An annular cam member 20 is turnably fitted into the outer circumference of the holder fitting member 17, cam member 20 having its inner circumferential surface defined as a cam surface 20a which is brought into sliding contact with the cam follower 19. A gear 21 is fitted on the outer circumference at the front end portion of the rotary outer cylinder 12 and is turnably engaged with the cam member 20 via engaging sections 22a, 22b and the like.

Revolution of gear 21 is accomplished by engaging it with a gear 24 driven for rotation by a separate over-drive device (rotary actuator 23) and with a gear 26 disposed at the other end of a gear shaft 25 of this gear 24 in order to transmit the revolution to the aforementioned rotary outer cylinder 12. The over-drive device 23 may be of a known rotary actuator. In the drawing, reference numeral 27 designates a differential gear shaft of the actuator numerals; 28, 28 represents a pair of bevel gears opposed to each other on the differential gear shaft and 29, 29 denote a pair of bevel gears that the disposed respectively on shafts 30, 30 each crisscrossing the abovementioned shaft 27 and engaging with each of the bevel gears 28, 28. The differential gear shaft 27 is pivoted to a frame 31 via a bearing 32 and is rotationally driven by means of a proper driving source (not shown).

The over-drive device 23 is driven when the flaws of blank wire 2 are detected by the aforementioned flaw detector (shown in FIG. 6) by means of cutting instruction given in terms of suitable electric signals. When driven, this device 23 rotates the differential gear shaft 27 in the normal direction. Interlocking gears 33, 33 are disposed, respectively, to mate with the bevel gears 28, 28 on the shaft 27 whereby one of the interlocking gears engages with the interlocking gear 24 mating with the gear 21 on the side of the rotary outer cylinder 12 while the other engages with a gear 35 also disposed on the outer cylinder (12) side so as to rotate interlockingly with a driving pulley 34 disposed similarly on the rotary outer cylinder side as shown in the drawing.

A collet 36, which is retractile in the radial direction, is fitted at the front end portion of the aforementioned hollow collet shaft 10. Expansion and contraction of the collet 36 can be obtained automatically when it is caused to advance or retreat by means of a spring 38 shown in the drawing while the head 36a of the collet 36 is engaged with the tapered guide surface 37 defined on the inner circumferential surface at the front end of the hollow shaft 11. In other words, the rear end of the collet shaft 10 is loosely fitted into a pair of adjustable front and rear stoppers 39, 40 that are defined by the use of the rear end of the hollow shaft 11. One end of the spring 38 is resiliently supported by the stopper 40 between a pair of the stoppers while the other end is resiliently supported by the collet shaft 10 via a locking section 41 so that when the spring 38 is under the released state, the resiliency of the spring 38 causes the collet shaft to move leftward as viewed in the drawing whereby its collet 36 shrinks due to its engagement with the head 36a on the tapered guide surface 37, thereby securing the small diameter portion of the blank wire 2 so cut. In this instance the collet shaft 10 as well as the collet 36 are held at their retreating positions by compression of the spring 38 which is brought under the compressed state by a rod 43 of a cylinder 42 actuated hydraulically, for example.

Figure 3:
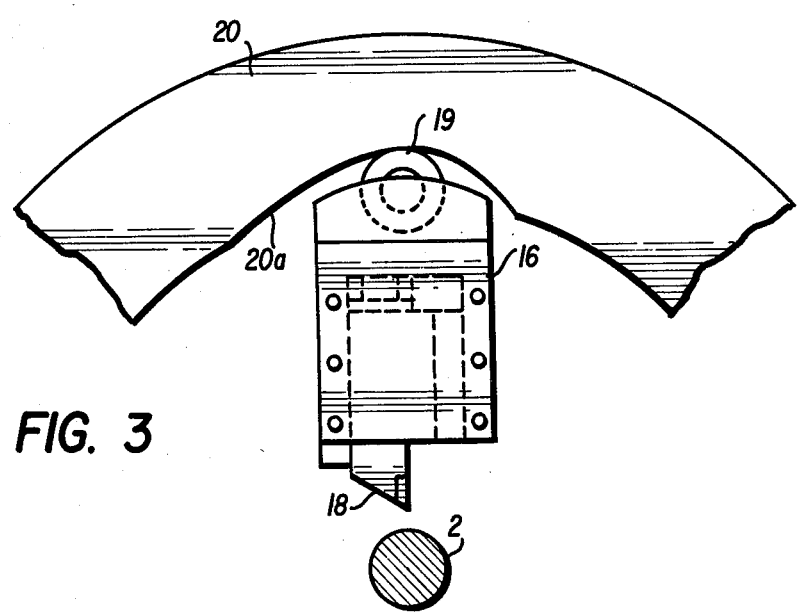

FIGS. 3 and 4 show, respectively, the associated construction between the cutting tool 18 and the cam member 20 in the aforementioned cutting tool holder 16, whereby FIG. 3 shows the waiting state of the cutting tool 18. In this case, the cam follower 19 enters the recess of the cam surface 20a so that both of the cutting tool holder 16 and the cutting tool 18 are in an elevated position. In FIG. 4, the cam follower 19 is shown pushed out from the recess due to movement of the cam surface 20a along with revolution of the cam member 20 whereby the tool holder 16 as well as the cutting tool 18 are lowered and are ready for cutting the outer circumference of the blank wire 2. In this case, it is preferred to arrange a plurality of cutting tools 18 together with a plurality of tool holders 16 and cam followers 19 on the same sectional plane equidistantly in the radial direction with respect to the blank wire 2 and to also define a plurality of recesses on the cam surface 20a of the cam member 20 so that all the cutting tools 18 are simultaneously actuated to perform the cutting work.

Figure 5:
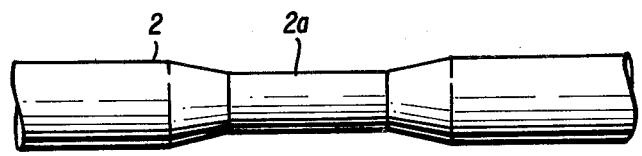
FIG. 5 is a schematic view showing the shapes of flaws cut and removed in accordance with the present invention.

In conjunction with the holding of the blank wire 2 as the material to be machined, the collect 36 shown in the drawing functions to hold the blank wire 2 after cutting, that is, on the outlet side. In order to hold the blank wire on the upstream side of the cutting tool 18, that is, on the inlet side, another collet having a diameter in conformity with the diameter of the blank wire is disposed separately on the inlet side. Though not shown in the drawing, this collet does not need any specific consideration as to its operation mechanism during operation except that its inner diameter adjusting mechanism matches with the dimension of the blank material because it is disposed in the travelling passage of the uncut material. FIG. 5 depicts the cutting shape in accordance with the present invention wherein the small diameter portion shows the cut section 2a.

Automatic cutting and removal of the surface flaws of the blank wire 2 (material to be machined) by this centerless peeling machine 5' are performed in the following manner. Namely, in the line where the blank wire 2 is sequentially fed into the machine 5' via the supply stand 1, the straightener 3 and the cutting machine 4 and is being wound onto the winding machine 6 as shown in FIG. 6, the flaw detector 5 is not actuated if the flawless portion, perfectly free from surface flaws, is being wound whereby the cutting tool 18 is in the elevated and waiting state as shown in FIG. 3. In this case, since the rotary outer cylinder 12 is driven for rotation by the driving pulley 34, this revolution is transmitted from the gear 35 on the outer cylinder 12 to the group of differential gears 28 and 29 on the actuator (23) side via the gear 33 and from thence to the gears 24, 26 and 21 so that the cam member 20 is also rotated integrally via the gear 21 and the engaging sections 22a and 22b. As the over-drive device 23 is actuated only when the cutting instruction is given, its differential gear shaft 27 is halted under a flawless state. Hence, the differential gear group (28, 29) idly rotates as a whole whereby it is possible to perfectly synchronizethe speed of revolution of the outer rotary cylinder 12 with that of the gear 21 accompanied with the cam member 20 and hence, with the speed of the cam member 20. Consequently, the cam member 20, the cutting tool holder 16 and the cutting tool 18 are caused to rotate integrally with one another as in the state shown in FIG. 3 so that the cutting tool 18 is halted at its elevated state and theblank wire 2 passes by therebelow as is.

In relation with the hollow shaft 11 and the collet shaft 10 coaxial therewith, the collet shaft 10 and its collet 36 are at the respective retreated positions which are more rightward as viewed in FIG. 2 and the collet 36 is therefore retracted from an tapered guide surface 37 of the hollow shaft 11 and is under the expanded state. Hence, the blank wire 2 is not held by the collet 36 and is wound smoothly without any restriction by the winding machine 9 through the travelling passage 10a of the collet shaft 36.

If there are any surface flaws on the blank wire 2 and such are detected by the detector 5 which, in turn, generates the cutting instruction for the flaw portion, the over-drive device 23 (rotary actuator) is driven upon receipt of the cutting instruction and its differential gear shaft 27 is rotated in the normal direction. Due to the rotation of this shaft 27, the shaft 30 interconnected therewith is also driven for rotation so that rotation of the bevel gear 28 is increased via the bevel gears 29, 29 and consequently, rotation of each of the gears 33, 24, the shaft 25 and the gear 26 also is increased, so that the relation of rotation between the rotary outer cylinder 12 and the cam member 20 is deviated by a quantity corresponding to a revolution of the differential gear shaft 27. Accordingly, the cam surface 20a of the cam member 20 moves as shown in FIG. 4 and the tool holder 16 lowers via the cam follower 19, thereby causing the cutting tool 18 to cut off the surface and the flaw portion of the blank wire 2 as shown in the drawing. In this instance, it is possible to adjust the degree of lowering of the cutting tool 18 of the tool holder 16 by adjusting the speed of revolution of the bevel gear 28 in conjunction with the shape of the cam surface 20a of the cam member 20. It is therefore possible to properly select the cut-in depth of the cutting tool 18. If the spring 38 is released from its compressed state into a free state during this cutting work via the cylinder 42, the collet shaft 10 is caused to move leftward in FIG. 2 together with the collet 36, thereby allowing its head 36a to engage with the tapered guide surface 37. Consequently collet 36 is contracted to decrease its inner diameter and to thus hold the cut portion of the blank wire 2.

In this case, it is necessary to adjust the spring 38 least the frictional force between the blank wire 2 and the collet 36 overcomes the winding force of the winding machine 9 and restricts the travel of the blank wire 2. Namely, the spring 38 is set in such a manner that even at the time of gradual increase in the diameter of the blank wire due to elevation and retreat of the cutting tool 18, balance is established by the righting force of the spring, thereby completing holding of the blank wire 2 and ensuring smooth cutting and removal of flaws. After the flaws are cut and removed and the wire passes by the cutting tool in this manner, the over-drive device 23 (rotary actuator) is reversely actuated by the cut-end instruction and differential gear shaft 27 is also reversely rotated whereby the cam member 20 is reversely rotated by means of the aforementioned gear transmission. Consequently, the cutting tool 18 of the tool holder 16 is elevated by the action of the centrifugal force via the guide of the cam follower 19 and the cam surface 20a, resumes its original position and again waits for the cutting instruction upon subsequent detection of the flows while rotating idly in the outer circumferential direction of the blank wire 2. The collet 36 and the collet shaft 10 that are at their respective advance positions are moved back by the return stroke of the rod 43 of the cylinder 42 and the collet 36 is also expanded.

As described in the foregoing paragraph, the present invention deals with the automatic control of the centerless peeling machine 5' having the construction wherein the cutting tool 18 is allowed to be retractile with respect to the blank wire 2 by means of the driving device. Though the embodiment shown in FIGS. 2 through 6 uses the mechanism such as shown therein, as the driving device for each of the cutting tool 18 and the collet 36, the driving device may be course be of an optional type. FIG. 6 shows the embodiment using a hydraulic device as an example of the driving device for the cutting tool and the collet.

Figure 7:
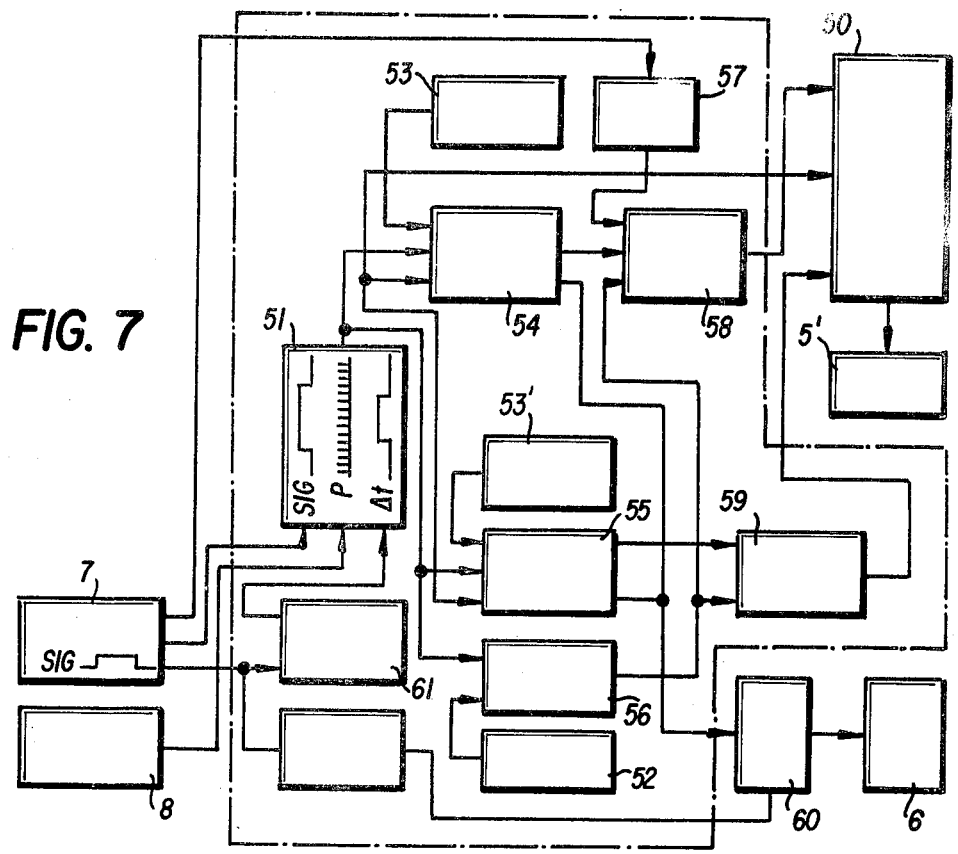
FIG. 7 is a block diagram of the control means in accordance with the method of the present invention.

FIG. 7 is a block diagram of the control mechanism in the abovementioned controlling device 9 of the present invention, explanation of which will be given in the paragraph to follow. When the surface flaw on the blank wire 2 is detected by the flaw detector 7 the depth of the flaw is first transmitted to a cut-in depth setter 57 fo the cutting tool that is incorporated in the controlling device 9 and at the same time, flaw-detection/flaw-end signals (Sig) are transmitted to a pulse operator 51, which are also transmitted to a sampling signal voltage generator 61. In this instance, the measuring roller 8 shown in FIG. 6 is brought into contact with the surface of the blank wire 2 and transmits to the pulse operator 51 a number of pulses that correspond to the measuring length (flaw length).

The abovementioned pulse operator 51 has the following three functions. First, it calculates the travelling speed V of the blank wire 2 on the line by means of the pulse number and the sampling time $\Delta t$ transmitted from the sampling signal voltage generator 61 and feeds the signal to a travelling speed operator 56 for the cutting tool incorporated in the controlling device 9. Second, upon receipt of the aforementioned flaw-detection signal, the pulse operator 51 transmits pulses to a frontend length counter 54 that is also incorporated within the controlling device and third, the operator 51 transmits pulses to a rear-end length counter 55 of the controlling device 9 upon receipt of the flaw-end signal. Upon receipt of signals from the cut-in angle setter 52 for the cutting tool, that is set in advance, and from the pulse operator 51, the advance speed operator 56 for the cutting tool operates the advancing and retreating speeds of the cutting tool 18 in the radial direction and transmits these signals, respectively, to a tool advance signal converter 58 and to a tool retreat instruction convertor 59.

Set values are added, respectively, to the front end length counter 54 and to the rear end length counter 55 by the front end length setter 53 and the rear end length setter 53'. Upon receipt of pulses from the pulse operator 51, these counters 54 and 55 count the cut-start time by the cutting tool 18 and when the time reaches a set number, feed the count-up signals to the abovementioned tool advance instruction convertor 58 and to the tool retreat instruction convertor 59, thereby instructing advancing or retreating of the cutting tool 18.

In this case, the travelling speed of the blank wire 2 is controlled by applying signals from the front end length counter 54 and the rear end length counter 55 to a speed controller 60 for the motor of the winding machine 6. The set value of each of the front end length and rear end length setters 53 and 53' is determined by the set distance (gap) between the flaw detector 7 and the centerless peeling machine 5' and by the travelling speed of the blank wire 2, and the difference between the measured value and the detected flaw length is an allowable cut length for the detected length (i.e., flaw length).

Upon receiving the output signal from the front end length counter 54, the set quantity by the tool cut-in depth setter 57 as well as the speed ratio between the advancing speed and retreating speed of the cutting tool from the tool advance speed operator 56, the tool advance instruction convertor 58 transmits the instruction to the hydraulic device 50 for actuating the cutting tool and the collet. The front end length counter 54 has such a function that when time passes from the start of counting to the count-up, it does not count the pulse input from the start of operation of the hydraulic device 50 (i.e., advancing and retreating) till completion of operation of the device 50 (i.e., completion of cutting), and its information is transmitted by means of feed-back from the hydraulic device 50. Resetting of the counter is also effected in the same way. Upon receiving the output signal from the rear end length counter 55 and the speed ratio between the advancing speed and retreating speed of the cutting tool from the tool advance speed operator 56, the tool retreat instruction convertor 59 transmits its instruction to the hydraulic device 50 for actuating the cutting tool and the collet.

When a subsequent signal (flaw detection signal) is applied from the pulse operator 51 to the rear end length counter 55 during its counting, the counter 55 stops counting whereby the content of counting so far made is cancelled and the counter starts counting afresh by the rearmost signal of the subsequent signal. The counter is reset upon completion of the retreating motion, and its information is transmitted by means of feed-back from the abovementioned hydraulic device 50.

The motor speed controller 60 for the winding machine 6, which determines the travelling speed of the blank wire 2 on the line, performs signal processing of the advancing and retreating instructions for the cutting tool 18 from the front end length and rear end length counters 54 and 55 respectively, and controls the winding speed of the winding machine 6 in such a manner that the travelling speed of the blank wire 2 on the line is at a proper speed when its cutting is necessary and at a speed higher than the speed at the time of cutting when cutting is not necessary. In this case, as shown in FIG. 11, setting of a value smaller than the cut-in length set by the front end length setter is applied to the front end length counter 54 for the cut front end so that the motor speed controller 60 for the winding machine is supplied with the operation instruction more rapidly than the front end cut instruction (tool advance instruction) and is thus reduced down to a speed suitable for cutting. As to the rear end to be cut, the setting of a value greater than cut length set by the rear end length setter 52 is supplied to the rear end length counter 55 so that the motor speed controller 60 for the winding machine is supplied with the operation instruction in a manner more than the rear end cut instruction (tool retreat instruction) and is thus supplied with a faster feeding speed.

The hydraulic device 10 for actuating the cutting tool and the collet is actuated upon instruction from the tool advancing instruction convertor 58 and from the tool retreating instruction convertor 59 on the basis of results of the abovementioned operations and hydraulically controls the cutting tool 18 and the collet 36 of the centerless peeling machine 5' shown in FIGS. 2 through 4 so as to perform their necessary operations. In other words, the cutting tool 18 advances towards the blank wire 2 via the cam surface 20a and the cam follower 19 due to revolution of the cam member 20 caused by operation of the over-drive gear (rotary actuator) 23 upon detection of the surface flaws by the flaw detector 7 and cuts and removes the flaw, as described in the foregoing paragraph. At the same time, the collet advances together with the collet shaft 10 by means of the righting force of the spring 38 due to its release and clamps the small diameter portion of the blank wire formed by cutting. In performing a sequence of these operations, the most suitable and smooth actions are ensured for the cutting tool and the collet via the hydraulic device 51 on the basis of the operation results such as detections of the travelling speed of the blank wire 2 in the controlling device 9 of the present invention and of the flaw (including the size and depth of the flaw on the surface), selection of the cut-in depth of the tool due to the flaw depth signal as a result of the detections, the operation of the advancing and retreating times of the cutting tool obtained from the travelling speed signal, the flaw position signals such as the flaw detection signal and the flaw end signal and from the tool cut-in angle set value signal, the operation of the tool advancing and retreating speeds obtained from the travelling speed signal and the tool cut-in angle set value signal, and so forth.

By forming the feed-back circuit between the motor speed controller 60 for the winding machine, the flaw detector 7 and the sampling signal voltage generator 10 as shown in FIG. 7, it is also easy in this case to change over the travelling speed of the blank wire 2 to a speed suitable for cutting when cutting is made and to a speed higher than the speed at the time of cutting when cutting is not made, in synchronism with the advancing and retreating timings of the cutting tool determined by the travelling speed signal, the flaw position signals such as the flaw detection signal and the flaw-end signal, and the tool cutting angle set value signal. Table A serves to provide an overview of each of the elements shown in FIG. 7 and their corresponding function and method of operation.

TABLE A

| Element | Function | Method of Operation |
|---|---|---|
| Pulse operator 51 | Calculation of the travelling speed V | The travelling speed V is calculated in accordance with the equation: $V = P/\Delta t$, in which P indicates the number of pulses and the information thereon is transmitted from the pulse generator 8 to the pulse operator 51, with the information of the sampling signal voltage generator 61 which is connected with the eddy current flaw detector 7. |
| Cut-in angle setter 52 | Setting of cut-in angle | Cut-in angle, which is predetermined in advance in view of the operation conditions, is memorized in this element, and the information thereof is transmitted to the advance speed operator 56. |
| Advance speed operator 56 | Calculation of the advancing and retreating speeds v of the cutting tool | The speed v of the cutting tool is calculated in accordance with the equation: $v = \tan \theta \times V$. 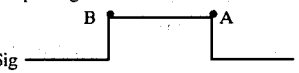 |
| Tool advance signal convertor 58 and Tool retreat signal convertor 59 | Conversion of voltage | Introduced to either element 58 or 59 is the speed signal v, the magnitude of which is mmV. The magnitude of this signal is amplified, in this element, form mmV level to V level in order for this signal to actuate the hydraulic device 50. |
| Front end length setter 53 and Rear end length setter 53' | Setting of the front and rear lengths | The distance between a flaw detecting point and a point when the peeling tool begins to move, is set in terms of the number of pulse, which is memorized in this element. |
| Front end length counter 54 and rear end length counter 55 | Determination of the advance and retreat point of the peeling tool | This element counts the number of pulses until it reaches the number thus memorized in the front or rear end length setter by and after receiving the signal of the point A or B transmitted from the pulse operator 51, in order to start the advancing or retreating movement of the peeling tool. <br> B ⎯⎯⎯ A <br> Sig ⎯⎯⎯⎯⎯⎯⎯⎯ |
| Motor speed controller 60 | Control of the motor speed | By receiving a flaw signal transmitted through the pulse operator 51 and the counter 54 or 55 from the eddy current flaw detector 7, the magnitude of the magnetic field is changed to thereby control the motor speed. 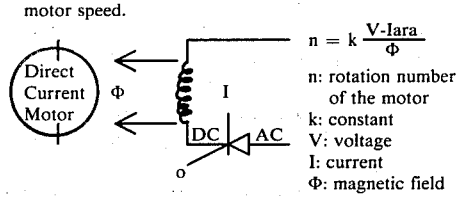 $n = k \frac{V-Iara}{\Phi}$ <br> n: rotation number of the motor <br> k: constant <br> V: voltage <br> I: current <br> $\Phi$: magnetic field <br> convertor |
| Tool cut-in depth setter 57 | Setting of the cut-in depth | The value of the cut-in depth set in advance is memorized in this element, and the signal thereon is transmitted by and after receiving the signal from the eddy current flaw detector 7. |
| Hydraulic device 50 | Operation of the peeling tool | Oil pressure switch is used for the feed back circuit connecting the device 50 and the counter 54 or 55. |

FIG. 8 is a schematic view showing the shape of cutting on the blank wire 2 in the present invention wherein reference numeral 2a represents the small diameter portion cut by the cutting tool 18. Symbol V represents the travelling speed of the blank wire 2 and A1 does the position immediately before the cutting tool 18 is to cut. Reference legend A2 represents the instantaneous position at the time when the cutting tool 18 stops retreating and v does the advancing and retreating speeds of the tool (action by means of the cam surface 20 and the cam follower 19). Reference letter L designates the length of the surface flaw and legend L1 denotes the time from the detection of the flaw L until the start of intrusion of the cutting tool 18. Reference legend L2 designates time from confirmation of the flaw end until the start of retreating of the cutting tool 18. Reference letter (a) stands for the outer diameter of the blank wire 2 before cutting and reference letter (c) does the cut quantity. Reference letter (g) represents the gap between the outer circumference of the blank wire 2 and the waiting position of the cutting tool 18, and l1 and l2 represent, respectively, allowable lengths for the shape of flaw coming into the inside with respect to the surface flaw and l3 denotes the length required to reach the cut-in quantity of c. Reference legend l4 represents the travelling length of the blank wire 2 in the non-machining time (coresponding to the gap between the outer circumference of the blank wire 2 and the cutting tool 18) at the time of advance and retreat, and $\theta$ denotes the cut-in angle of the cutting tool 18. When $\theta$ is constant, l1 and l2 can be varied by adjusting the abovementioned L1 and L2.

Figure 9:
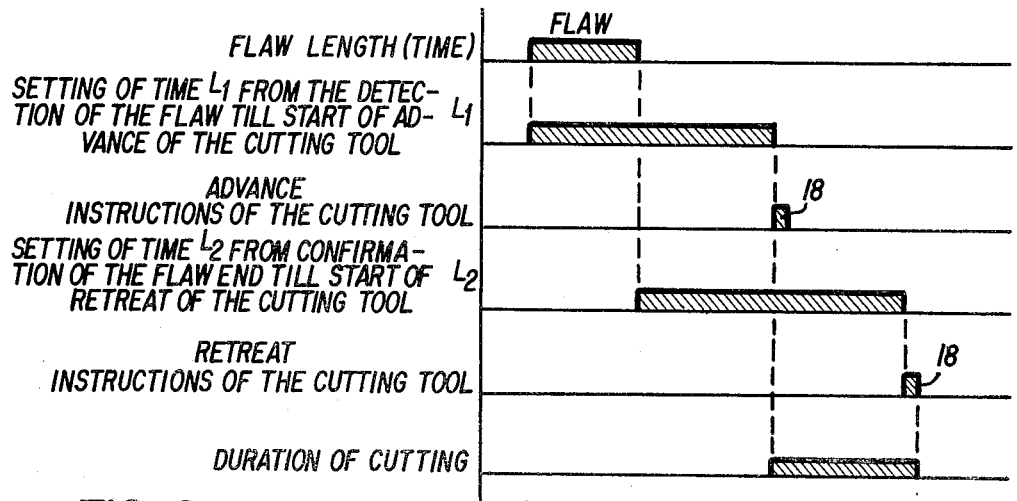

FIG. 9 is a time chart showing the time relationship between a flaw which has a relatively large gap between it and a subsequent flaw and hence, of which detection signal does not overlap with that of the latter, setting of time L1 from the detection of the flaw until start of advance of the cutting tool 18, setting of time L2 from confirmation of the flaw end till start of retreat of the cutting tool 18 and the advancing and retreating instructions of the cutting tool 18. On the other hand, FIG. 10 is a time chart showing the time relationship between the first and second flaws which have a short flaw gap between them and hence, of which detection signals overlap with each other, setting of time L1 from the detection of the flaws until start of advance of the cutting tool 18, setting of the time L2 from confirmation of the flaw end until start of retreat of the cutting tool 18, and the advancing and retreating instructions of the cutting tool 18. In the latter case, a plurality of counters may be disposed so as to operate respectively for the corresponding flaws. This arrangement enables cutting and removal of the respective flaws in the same way as in the embodiment shown in FIG. 9.

Figure 12:
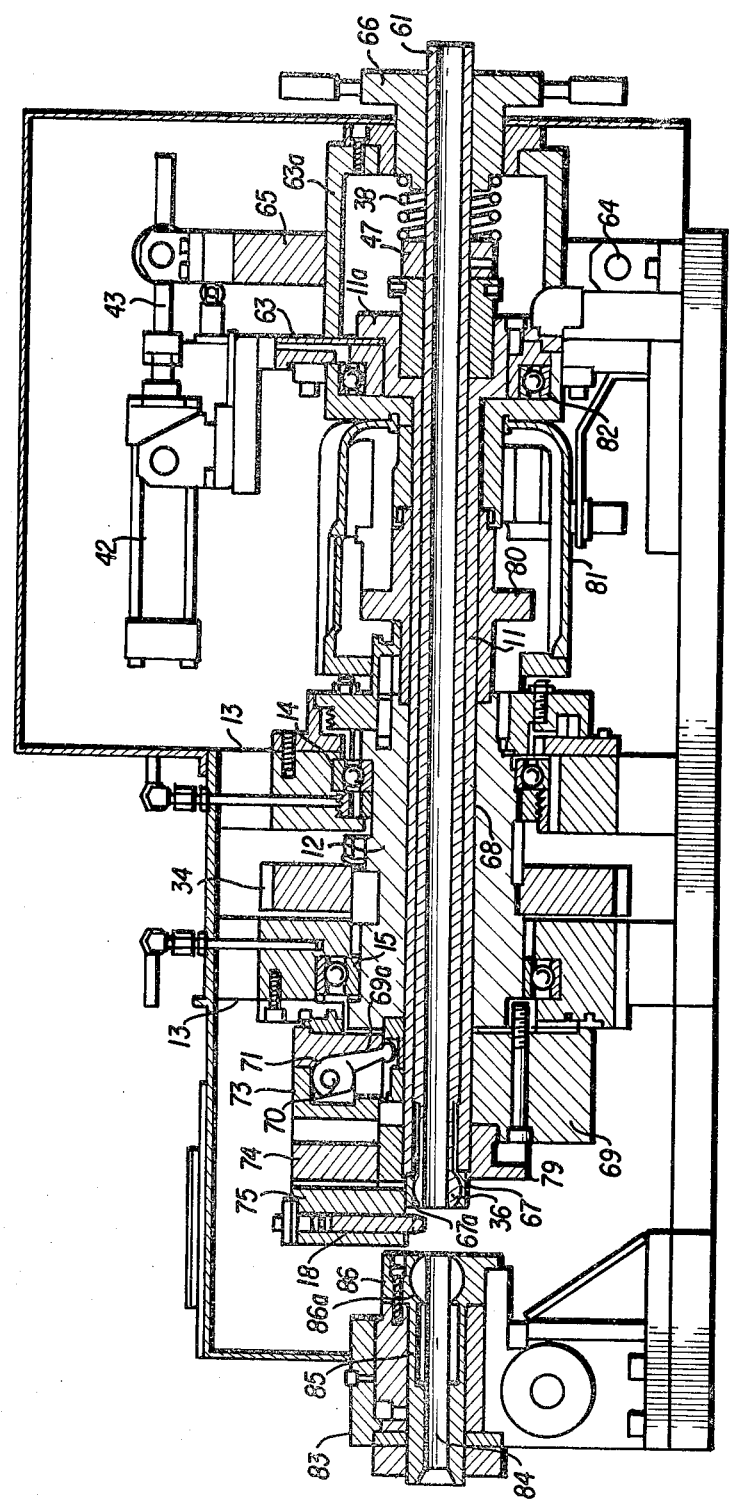
FIG. 12 is a longitudinally sectional front view showing the overall construction of another embodiment of the apparatus in accordance with the present invention.
Figure 13:
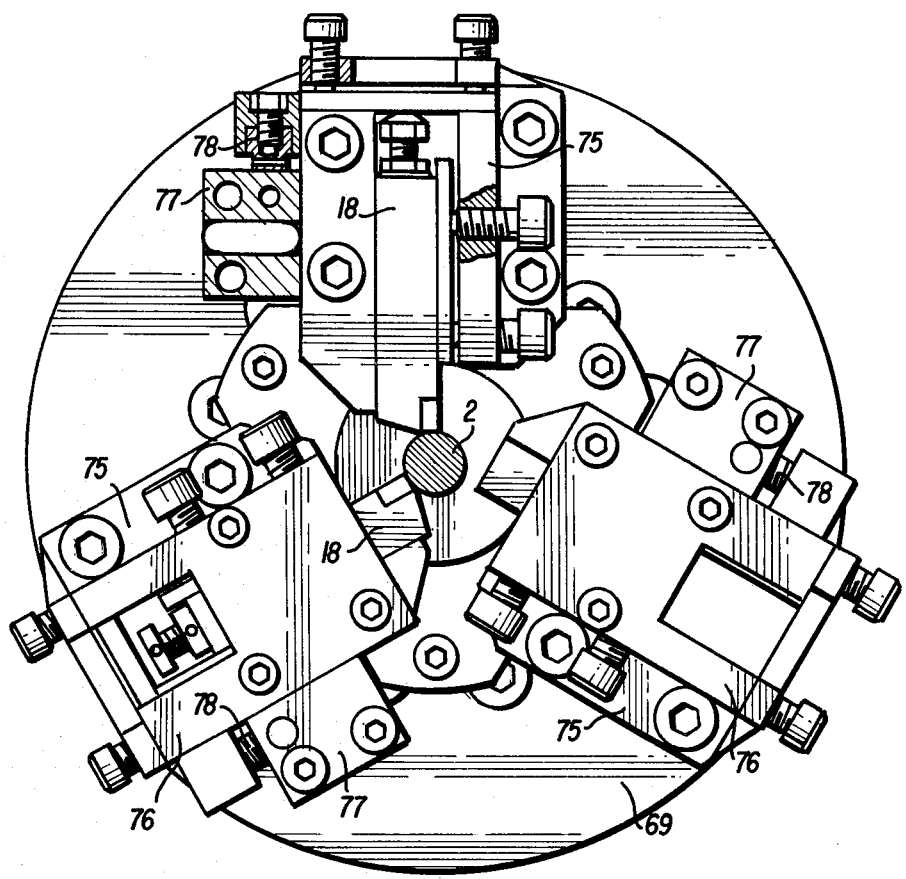
FIG. 13 is a side view showing the principal portion of the main body of the chuck of the apparatus of the present invention.
Figure 14:
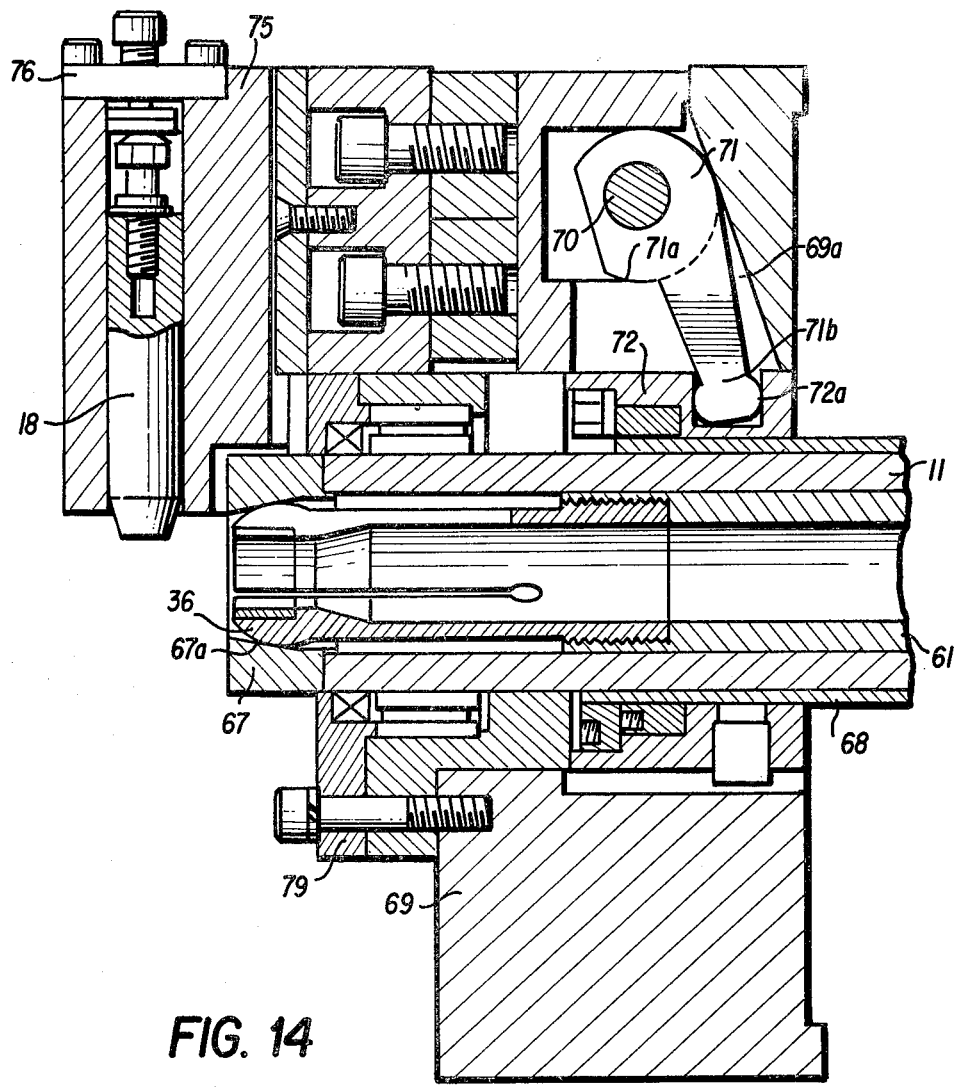
FIG. 14 is a longitudinally sectional front view showing the principal portion of the apparatus of the present invention.

FIG. 12 shows another embodiment of the present invention, FIG. 13 is a side view showing the principal portion of the main body of the chuck and FIG. 14 is a longitudinally sectional front view of the chuck. In these drawings, reference numeral 11 represents the hollow shaft defining therein the travelling passage of the aforementioned wire material 2, that is, a wire-like or rod-like material having an annular sectional shape. A collet support tube 61 is coaxially inserted into this hollow shaft 11 and substantially defines the abovementioned travelling passage. The collet 36 having a clamp section capable of expanding and contracting in the radial direction is fitted to the front end (inlet side) of the tube 61 for clamping the wire material 2 passing therethrough. In this case, the hollow shaft 11 is not rotary and its rear end flange 11a is secured to a mounting 63. On the other hand, the collet support tube 61 is slidably inserted into the hollow shaft 11 in the axial direction and its rear end protrudes outward beyond the rear end of the hollow shaft 11. This protrusive section is engaged a spring support plate 41 that is disposed on a retractile frame 65, which is connected to a retractile rod 43 of a spring support cylinder 42 adapted by use of the mounting 63 and the lower end of which is capable of rocking while it is pivoted to a pivot 64. The spring 38 is resiliently inserted between this support plate 41 (lock section) and a spring receiving plate 66 is adjustably fitted by use of a part 63a of the mounting 63. Accordingly, the collet support tube 61 is retractilly supported inside the hollow shaft 11 by relaxation of the spring 38 due to movement of the spring support plate 41 caused by the motion of the retractile rod 43 of the spring support cylinder 42 via the retractile frame 65 so that expansion and contraction of the collet 36 are made as the collet advances and retreats on the inclined surface 67a of a collet guide 67 formed at the front and of the hollow shaft 11. As will be described later, the collet clamps the portion of a reduced diameter of the wire material 2 formed as a result of cutting and removal of the flaw and permits passage of the flawless portion of the wire material as is.

A connection 68 is coaxially fitted around the outer circumference of the hollow shaft 11 both turnably and slidably in the axial direction, and around the outer circumference of this connection tube 68 is fitted the rotary outer cylinder 12 both coaxially and turnably together with the connection tube 68. The rotary cylinder 12 is turnably mounted onto the separate mounting 13 via the bearings 14 and 15 and a drive gear (or pulley) 34 is fitted to a part of the outer circumference of the outer cylinder 12 and is thus revolved by a proper prime mover means. At the front end of the rotary cylinder 12 is turnably fitted the main body of the chuck 69 which encompasses the front end portions of the connection tube 68 and the hollow shaft 11. As shown in FIGS. 13 and 14, the chuck main body 69 has a cylindrical form and the connection tube 68 and the hollow shaft 11 are inserted through the center of the chuck-main body. Three slit sections 69a are shown formed equidistantly around the outer circumference of the chuck main body, each slit section opening in the radial direction and extending in the axial direction. A cam lever pin 70 is disposed inside the base portion of each slit section 69a in the direction parallel to the tangential line of the rotary members such as the abovementioned rotary outer cylinder 12 and the connection tube 68 so as to transversely cross the slit section 69a. One end of a cam lever 71 is pivoted to this pin 70, and a cam surface 71a is formed at the outer circumferential portion at the pivoted end of the lever eccentially with respect to the center of the cam lever pin 70. The other end 71b of the cam lever 71 is engaged with a lock slit 72a formed at the corresponding position on the outer circumference of the large diameter portion at the front end of the connection tube 68.

A holder member consisting of an integral assembly of a master jaw 73 and a pawl 74 is fitted into each slit section 69a retractilly in the radial direction and the master jaw 73 is engaged with the cam surface 71a of the abovementioned cam lever 71 while the pawl 74 retains the holder 75. The cutting tool 18 is fitted to the holder 75 via the tool support plate 76. A striker 78 is disposed on the holder support member side so that the striker 78 and a stopper 77 disposed on the chuck main body 69 together allow free adjustment of the cut-in quantity of the cutting tool 18 into the outer circumferential surface of the wire material 2 when the striker 78 is replaced. In the embodiment shown, reference numeral 79 represents a chuck piston adapted at the central front end of the chuck main body 69.

At the other end of the connection tube 68 protruding rearwardly from the rear end of the outer rotary cylinder 12 is integrally formed a cylinder piston section 80 of a large diameter as shown in FIG. 12, and a rotary cylinder 81 is fitted at the rear end of the piston section 80 and hence, at the rear end of the outer rotary cylinder 11, so as to encompass the hollow shaft 11 from the outside. Since this cylinder 81 rotates around the hollow shaft 11 together with the rotary outer cylinder 12, the rear end of the cylinder 81 is turnably supported on the side of the mounting 63 via a bearing 82 as shown in the drawing.

In FIG. 12, reference numeral 83 represents a clamp guide mounting for the wire material 2 which is positioned ahead of the butting tool 18 so as to correspond to the cutting apparatus of the present invention. A wire material travelling passage 84 is defined in the mounting 83 together with a collect 85 and a collet guide 86 concentrically with respect to the hollow shaft 11 of the present invention. Since this passage is disposed at the portion of the travel of the uncut wire material 2, the collet 85 and the collet guide 86 may be of a replaceable type so that their inner diameter be changed merely in accordance with the outer diameter of the wire material 2. Reference numeral 86a represents an inclined surface on the collet guide 86 which is defined for the purpose of expansion and contraction of the collet 85 and for clamping the wire material 2 during the cutting work.

Having the principal construction as described above, the apparatus in accordance with the present invention detects the surface flaws distributed on the surface of the wire material 2 and automatically cuts and removes only the flaw portions in the following manner. As can be clearly appreciated from the explanation about the line shown in FIG. 6, the surface flaws distributed on the surface of the wire material 2 are first detected by the flaw detector 7 and the subsequent measuring rollers 8 then detects the travelling speed of the wire material 2. Information regarding both the positions of flaws in the longitudinal direction and the travelling speed of the wire material thus obtained is sent to the controlling device 9 whereby cutting of the surface flaw portions is initiated. However, explanation will be first given regarding the state where the wire material 2 free from flaws is being wound up. Under the condition where no surface flaw is detected at all, revolution of the driving gear 34 is transmitted, via the simultaneous revolution of the rotary outer cylinder 12, to the connection tube 68, to its piston section 80, to the rotary cylinder 81, further to the chuck main body 69, to the holder support member consisting of the master jaw 73 and the pawl 74, to the holder 75 and to the chuck piston 79, respectively, whereby these members are caused to integrally rotate around the hollow shaft 11 with each other. However, since no cutting instruction is generated from the controlling device 9 to the rotary cylinder 81, the cylinder is not actuated and hence, the piston section 80 and the connection tube 68 do not move in the axial direction. In this instance, as the spring 38 acting on the collet support tube 61 is kept in the state of its natural length (non-compressed state) via the rod 43 of the spring support cylinder 42 and the retractile frame 65 as well as the spring support plate 41 each connected to the rod 43, the collet 36 on the inlet side is kept at the retreat position (expanding position) so that the wire material is allowed to pass therethrough freely and is sequentially taken up onto the winding machine.

Next, explanation will be given regarding the case where the surface flaws are present on the wire material 2. Since the controlling device 9 generates the cutting instruction in this case, the rotary cylinder 81 is actuated and the piston section 80 inside the cylinder 81 moves rightward as viewed in FIG. 12. As the connection tube 68 also is moved in the same direction, the cam lever 71, of which one end 71b is locked by the lock slit 72a of the large diameter section 72 at the front end of the connection tube 68, is caused to rotate counterclockwise with the cam lever pin 70 being as its support point and directs the master jaw 73 of the holder support member via its cam surface 71a in the axial direction, that is, in the direction of center of the hollow shaft 11. As the pawl 74 follows up the movement of the master jaw 73, the holder 32, the cutting tool 18 and the tool support plate 76 are also caused to advance in the axial direction integrally with one another so that only the outer circumference of the surface flaw portions of the wire material 2 is cut and removed by the cutting tool 18. In other words, since the chuck main body 69 rotates as a whole, each cutting tool 18 of each holder 75 disposed in each slit section 69a of the chuck main body cuts the surface flaw portion of the wire material 2 over its entire circumference, and its cutting shape is as shown in FIG. 5. In this drawing, it is suitable that the length of the tapered portion in the longitudinal direction of the wire material be at least about 5 mm and that the surface coarseness of the cut surface be up to 30 microns. These values are determined in consideration of the passage of the stretched wire through the die in the subsequent wire stretching step.

The following actions take place on the side of the spring support cylinder 42 simultaneously with the start of cutting of the surface flaws. Namely, the spring support cylinder 42 is also actuated simultaneously with the cutting instruction and its rod 43 is moved leftward as viewed in FIG. 12 so that the collect support tube 61 is also caused to move leftward in the drawing via the resiliency of the spring 38 acting through the movement of the retractile frame 65 and support plate 41. Consequently, the collect 36, that has so far been at the retreat position, also advance along the inclined surface of the collet guide 67 and its inner diameter is thereby contracted. Reliable clamping of the wire material 2 by the collet 36 can be obtained in a well balanced manner by the resilient support action of the spring 38 during advancement of the wire material in the axial direction along the progressively increasing tapered section prior to its intrusion into the small-diameter cutting portion and during its retreat from the axial direction along the progressively decreasing tapered section. Hence, automatic cutting is applied smoothly only to the outer circumference of the surface flaw portion of the wire material 2.

After the cutting of the outer circumference of the surface flaw portion is completed in this manner and the cut portion passes by, followed thereby by the generation of the cut-end instruction from the controlling device 9, the rotary cylinder 81 is then actuated so as to move the piston section 80 and the connection tube 68 in the lefthand direction as viewed in FIG. 12. Due to the retreating of the support member and the holder from the axial direction via the return of the cam lever 71, the cutting tool 18 is also caused to retreat and to depart from the circumference of the wire material, and awaits the subsequent cutting instruction while rotating around the wire material 2 along with revolution of the rotary outer cylinder 12. At the same time, the spring support cylinder 42 is also actuated so that the spring 38 returns to its original position as the rod 43 returns to its original position, and the collet 36 at the tip of the collet support tube 61 retreats together with the tube 61 to its expanding position, thereby allowing free passage of the flawless portion of the wire material 2. It goes without special noting in this instance that the length in the longitudinal direction of each tapered section defined at the front and back of the small diameter cutting section 2a for cutting of the surface flaw of the wire material is determined by the travelling speed of the wire material and the advancing and retreating speeds of the cutting tool 18.

As described in the foregoing paragraph, the present invention uses a centerless peeling machine equipped with a cutting tool retractile to and from a material to be machined and capable of automatically detecting the surface flaws of the material so that, on the basis of the detection signals, a cut-in depth of the cutting tool in response to the content of the flaws, the correct timing of its retraction in accordance with the travelling speed of the material to be machined and its speed of retraction can be determined and controlled automatically. In this manner, the present invention enables accomplishment automatically of a sequence of flaw-removing operations such as cutting and removing smoothly and perfectly only the surface flaw portion at a suitable speed and allowing the high speed passage of the flawless portion. In comparison with the conventional apparatus of the rotary cutting tool type which cuts off the wire material over its entire length irrespective of the absence or presence of the flaws, the apparatus of the present invention remarkably improves the yield of the material, prevents excessive and quick abrasion of the cutting tool, eliminates unnecessary cutting, shortens the cutting time and thus enables one to reduce the cost of cutting work as a whole to a marked extent. Cutting in the apparatus of the present invention is effected on the basis of operation of various factors in combination, the apparatus is completely free from the cutting mistakes and ensures perfect removal of the flaws in an effective manner. Accordingly the apparatus of the present invention is extremely excellent as an automatic flaw removing mechanisms for various wire materials and rod materials. Since the apparatus of the present invention can be easily obtained by applying considerable improvements to the cutting tool and to the collet of the existing centerless peeling machine and by combining the machine with a controlling instrument having a relatively simple construction, the apparatus of the invention is free from difficulty regarding its practical feasibility and in complexity in its handling and operation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for controlling cutting of a surface flaw of a wire material or a rod-like material to be machined by a cutting tool which comprises:
    feeding the material to be machined;
    detecting the travelling speed and the surface flaw position of the material to be machined and transmitting corresponding signals;
    setting a depth of cut to be applied to the cutting tool in accordance with a flaw depth signal of the detecting signals;
    rotating the cutting tool about the axis of the material to be machined;
    feeding the material to be machined longitudinally past the cutting tool;
    advancing and retracting the cutting tool so as to cut the material to be machined on the basis of the travelling speed signal, a flaw position signal and a predetermined cut-in angle set value signal
    controlling advancing and retracting speeds of the cutting tool on the basis of the travelling speed signal and the predetermined cut-in angle set value; and
    actuating and controlling a tool driving device on the basis of the results of these operations.

2. The process for controlling cutting of a surface flaw of a material to be machined as defined in claim 1 which further comprises controlling the travelling speed of the material to be machined in such a manner so as to be suitable for cutting during the cutting work and so as to be higher than cutting speed when cutting is not effected.

3. An apparatus for cutting a surface flaw of a wire material or a rod-like material to be machined comprising:
    means for feeding the material to be machined;
    means for detecting the position and depth of the flaw and for generating position and flaw depth detection signals;
    means for detecting the travelling speed of the material to be machined;
    cutting means;
    means for advancing and retracting said cutting means only to the outer circumference of the surface flaw position of the material to be machined in a radial direction;
    means for rotating the cutting means about the longitudinal axis of the material to be machined;
    said means for feeding the material to be machined further comprising means for feeding the material to be machined longitudinally past the cutting means;
    means for setting the depth of cut to be applied to said cutting means in accordance with the flaw depth signal;
    said means for advancing and retracting said cutting means further comprising means for advancing and retracting said cutting means on the basis of the travelling speed of the material to be machined, the flaw position signal and a predetermined cut-in angle set value signal for said cutting means that is set in advance
    means for operating the speed of advancing and retracting of said cutting means on the basis of said travelling speed signal and said predetermined cut-in angle set value signal of said cutting means; and
    control means for driving said cutting means on the basis of the results of said operations.

4. The apparatus for cutting a surface flaw of a wire material or a rod-like material as defined in claim 3, further comprising:
- a frame;
- a hollow shaft defining therein a travelling passage of the material to be machined;
- a retractible tool holder capable of advancing and retreating in the radial direction of the material to be machined;
- a holder fitting member;
- a rotary outer cylinder having said retractile tool holder fitted onto a front end surface thereof via said holder fitting member, fitted turnably onto said hollow shaft from an outside portion thereof and mounted turnably onto said frame;
- a cam follower fitted to the rear end of said tool holder;
- a cam member having a cam surface defined on the inner circumference thereof in sliding contact with said cam follower and turnably fitted onto said holder fitting member from an outside portion thereof;
- a gear turnably fitted to the front end surface of said rotary outer cylinder and integrally combined with said cam member; and
- a gear train and an over-drive device for transmitting revolutions of said rotary outer cylinder to said gear.

5. The apparatus for cutting a surface flaw of a wire material or a rod-like material as defined in claim 3 further comprising a rotary tool capable of advancing and retreating in a radial direction and an eddy current flaw detector wherein flaws present on the surface of the wire material or the rod-like material having a circular section are detected by a pair of measuring rolls such that the travelling speed of the material to be machined is detected by said pair of measuring rolls so that only the outer circumference of the flaw portions of the material to be machined is cut and removed by said rotary cutting tool on the basis of the information received regarding the positions of flaws in the longitudinal direction by said flow detector and the information regarding the outer diameter by said pair of measuring rolls, said apparatus further comprising:
- a hollow shaft defining therein the travelling passage of the material to be machined;
- a connection tube fitted from the outside onto the outer circumference of said hollow shaft both turnably and movably in the longitudinal direction;
- a rotary outer cylinder fitted turnably onto the outer circumference of said connection tube;
- a driving pulley fitted to the outer circumference of said rotary outer cylinder and transmitting a driving force to each rotary member;
- a chuck main body fitted to the front end portion of said rotary outer cylinder;
- slit sections defined in the radial direction equidistantly around the circumference of said chuck main body;
- a cam lever pin fitted into each of said slit sections in the direction parallel to the tangential line of the rotary members such as said rotary outer cylinder;
- a cam lever having one end pivoted to each of said cam lever pins, a cam surface defined at the pivoted portion on the outer circumference thereof and the other end locked at the front portion of said connection tube;
- a holder support member disposed inside each of said slit sections of said chuck main body, engaging with said cam surface of said cam lever and capable of advancing and retreating in the radial direction;
- a cutting tool fitted to each of said holder support members via a holder;
- a piston section of a large diameter formed at the rear portion of said connection tube; and
- a rotary cylinder fitted to the rear end portion of said rotary outer cylinder and allowing said piston section to engage therewith and to slide back and forth.

* * * * *

UNITED STATES PATENT AND TRADEMARK OFFICE
CERTIFICATE OF CORRECTION

PATENT NO. : 4,291,600
DATED : Sep. 29, 1981
INVENTOR(S) : YOSIYUKI KAWAGUCHI ET AL

It is certified that error appears in the above-identified patent and that said Letters Patent are hereby corrected as shown below:

On the Title Page insert the following Priority Data:
[30]---Foreign Application Priority Data Feb. 7, 1978  [JP]   JAPAN......53-13876

Mar. 24, 1978  [JP]   JAPAN......53-34760

Signed and Sealed this

Twenty-sixth Day of January 1982

[SEAL]

*Attest:*

*Attesting Officer*

GERALD J. MOSSINGHOFF

*Commissioner of Patents and Trademarks*